United States Patent [19]

Kaufman et al.

[11] 4,085,735
[45] Apr. 25, 1978

[54] AIR VENTILATION AND WASHING SYSTEM

[75] Inventors: Arnold S. Kaufman, Studio City; Robert L. Anderson, Reseda, both of Calif.

[73] Assignee: National Food Service Equipment Fabricators, Inc., Glendale, Calif.

[21] Appl. No.: 652,484

[22] Filed: Jan. 26, 1976

[51] Int. Cl.² ............................................. F24C 15/20
[52] U.S. Cl. .................................. 126/299 E; 55/229; 55/DIG. 36; 169/65
[58] Field of Search ..................... 98/115 K, 115 R; 169/60, 61, 65; 55/220, 228, 229, DIG. 36; 126/299 R, 299 A, 299 B, 299 C, 299 E

[56] References Cited

U.S. PATENT DOCUMENTS

| | | | |
|---|---|---|---|
| 3,055,285 | 9/1962 | Gaylord | 98/115 K |
| 3,324,629 | 6/1967 | Graswich et al. | 98/115 K |
| 3,448,808 | 6/1969 | Scofield et al. | 169/65 |
| 3,463,233 | 8/1969 | Haessler | 98/115 K |
| 3,490,206 | 1/1970 | Doane | 98/115 K |
| 3,616,744 | 11/1971 | Jensen | 98/115 K |
| 3,653,443 | 4/1972 | Dockery | 169/65 |
| 3,664,255 | 5/1972 | Kuechler | 98/115 K |
| 3,786,739 | 1/1974 | Wright | 98/115 K |
| 3,795,181 | 3/1974 | Lawson | 98/115 K |

Primary Examiner—Ronald C. Capossela
Attorney, Agent, or Firm—Subkow and Kriegel

[57] ABSTRACT

An air ventilation and washing system for extracting noxious or other impure air, such as is present above the cooking surface of a stove having automatically activated electrical and mechanical fire control apparatus selectively responsive to changes in temperature is disclosed.

15 Claims, 4 Drawing Figures

AIR VENTILATION AND WASHING SYSTEM

BACKGROUND OF THE INVENTION

The present invention relates to air ventilation and washing systems and in particular an air ventilation system for removing grease laden air produced as the result of cooking, and a washing system for cleaning any accumulation of grease within the system.

In commercial cooking establishments where large quantities of food are cooked on an open stove or on hot grills, large amounts of air contaminated with grease is produced. For reasons of health, safety and cleanliness, the heated grease laden air must be evacuated from within the room.

The early method of removing the undesirable air was merely to have a massive exhaust fan located in the ceiling or wall pull out the contaminated air from within the room. It was very soon recognized, however, that replacement air was required to be blown into the room in order to replace the air drawn out by the exhaust fan.

Such arrangements were undesirable for a number of reasons, including the most obvious reason that any chef working in the kitchen would be subjected to enormous drafts of hot and cold air. A further disadvantage of such systems was the great expense associated with the heating or cooling requirements of the kitchen. For example, any attempt to air condition the kitchen during the summertime would require a massive cooling system to maintain the temperature due to the fact that the cooled air would be almost immediately withdrawn from the room by the exhaust fan. Comparable difficulties would be encountered during the cold season when the heated air would be removed from the room, to be replaced by frigid outside air.

In recognition of the aforementioned disadvantages, air ventilation systems were devised which first forced a curtain of outside air over the cooking surface of the stove and then withdrew a mixture of the outside air and the inside air. Such ventilator systems are known as "air curtain ventilator systems," such as disclosed in the patent to Sweet, et al, U.S. Pat. No. 3,457,850, issued July 29, 1969.

In such systems, as indicated by their nomenclature "air curtain ventilator," a "curtain" of air was formed by forcing the outside air through a relatively narrow, substantially horizontally oriented opening so as to create a horizontal curtain of air over the exhaust or vapor collection chamber. Such a system is partially ineffective in removing contaminated air not immediately above the cooking surface.

Providing an exhaust system for removing the grease laden air above the stove, while solving one problem, created additional problems. As indicated above, the air above a kitchen stove, especially in a commercial establishment such as a restaurant, is heavily contaminated with grease from the foods being cooked. The collection of any quantities of grease presents a highly volatile source of fire. Grease filters located in the air exhaust system may remove a large quantity of the grease. The grease filter is periodically removed and either cleaned or replaced by a new grease filter.

The grease filter, however, does not remove all of the grease from the air, some of the grease passing through the filter and condensing on the surfaces of the grease duct and on the exhaust fan. The collection of the grease in a normally inaccessible area, in association with the high temperatures generated by the cooking surface, created a fire hazard.

The grease collected within the grease duct is such that they must be thoroughly cleaned, depending upon their use, every three months. Due to the general inaccessiblity of the grease ducts, the manual cleaning of the ducts is costly and highly inefficient. Large collections of grease may remain in the ducts for many weeks at a time. During such times the grease duct and other equipment are highly susceptible to fire. More frequent manual cleanings of the duct, however, is prohibitively expensive.

Recognition of the potential fire hazard presented by grease accumulations in the grease duct and the undesirability of having the ducts manually cleaned led to the development of automatic duct cleaning devices such as disclosed in the patent to Lawson, U.S. Pat. No. 3,795,181, issued Mar. 5, 1974. Such an automatic duct cleaning device forced hot water and a cleaning solution through a number of rotating spraying outlets on a hollow tube by the use of a fluid forcing device in order to spray the inside surfaces of the duct. The cleaning solution would homogonize the grease on the surfaces of the duct which would then flow down the sidewalls of the duct to be collected in a grease trap or other receptacle. Upon the completion of the washing cycle, the water and cleaning solution within the hollow tube would, under the force of gravity, collect within the housing of the means for forcing the cleaning fluid through the outlets. In periods of extreme cold, the water and cleaning solution would freeze, rendering the cleaning system inoperable.

While the automatic duct cleaning device of Lawson went a long way towards reducing the possibility of a fire occurring within the grease duct, such a possibility was not completely eliminated. Under certain circumstances grease might still collect in the duct, such as between washings, should the interval between washings be too long or should the washing equipment become inoperative and not be promptly fixed.

Chemical fire extinguisher systems conventionally located suspended from the vapor collection chamber above the cooking surface, responsive to excessive heat on the cooking surface, have been used. Ordinarily such fire extinguishing systems would not be activated by heat generated within the grease duct unless there was a substantial fire actively present within the duct. In any event, such a fire extinguishing system would serve only to extinguish the fire in the vicinity of the cooking and would have no effect on any fire within the air ventilation system.

SUMMARY OF THE INVENTION

In the present invention, an automatic duct cleaning device is disclosed in which the spraying outlets for the hot water and cleaning fluid are located below the fluid driving system thereby avoiding the possibility of trapped water freezing in the pipe within the cleaning system. In addition, a mechanical and a temperature controlled electrical fire extinguishing system is incorporated within the design of the duct washing system responsive to excess heat being generated within the exhaust duct network. In the preferred embodiment of the invention, two independent conditions serve to activate each of the fire extinguishing systems. The first condition for activating the electrical temperature controlled fire extinguishing system is the presence of relatively low temperature, in the order of 200° F. The precise temperature desired may be varied. Upon the selected temperature being reached, a temperature sensitive device, such as a thermostat, will automatically activate the washing cycle of the cleaning system. The washing cycle, consisting of spraying hot water and a cleaning detergent throughout the exhaust grease duct, will continue until the temperature at the entry of the exhaust duct sensed by the temperature controlled electrical device is less than the preselected temperature. Such a fire extinguishing system is fully automatic and does not require the resetting of the system.

The second fire extinguishing system is a mechanical fire extinguishing system, requiring no electrical power. Should there be a loss of electrical power due to a fire or any other reason, the mechanical fire extinguishing system continues to operate. It is intended that the mechanical fire extinguishing system be activated at a substantially higher temperature than that of the temperature controlled fire extinguishing system, such as approximately 350° F. It is further contemplated that once the mechanical fire extinguishing system is activated, that it would remain activated until manually disconnected, regardless of the drop in temperature within the exhaust grease duct.

In addition, the present invention provides an improved air ventilation system to more efficiently withdraw contaminated air by the appropriate positioning of the exhaust hood and the outside air intake hood.

It is an object of the invention to provide an improved air ventilation and washing system in which the washing apparatus is more reliable.

It is a further object of the present invention to provide an air ventilation and washing system which provides more efficient withdrawal of contaminated air.

A further object of the present invention is to provide an improved air ventilation and washing system having a mechanical fire extinguishing system.

It is a further object of the present invention to provide an air ventilation and washing system having an improved fire extinguishing system which is electrically controlled.

These and other objects and advantages of the present invention will be evident from a review of the following detailed description of the invention and of the accompanying drawings.

DETAILED DESCRIPTION OF THE DRAWINGS

Figure 1:
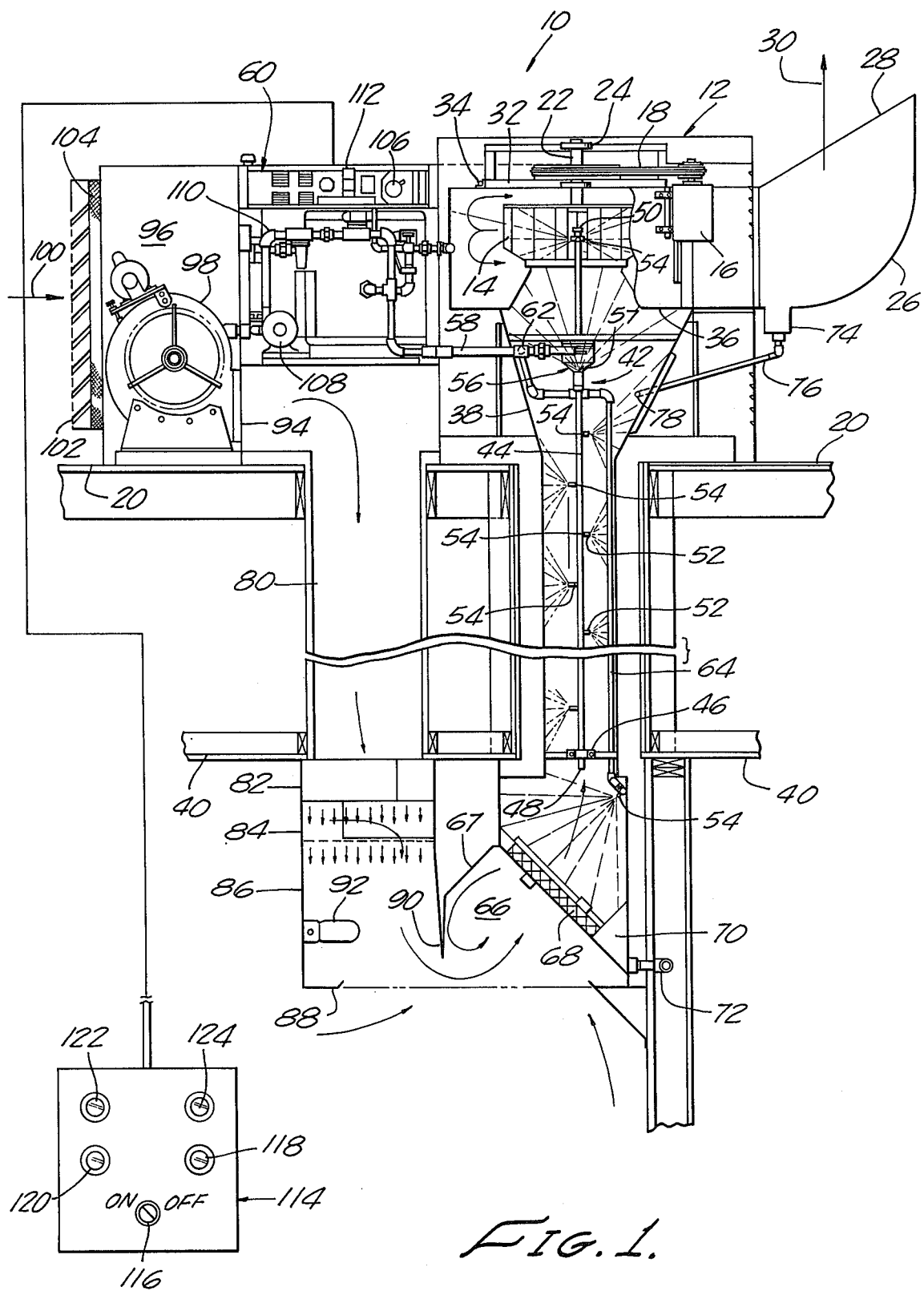
FIG. 1 is a cross-sectional side view of the improved air ventilation and washing systems.

Referring to FIG. 1, a cross-sectional side view of the ventilation and washing system 10 is shown. A hollow rectangular air box 12 mounted on roof 20 contains the air exhaust fan 14 which is powered by exhaust fan motor 16 by means of a fan belt 18. In the preferred embodiment of the invention the air exhaust fan 14 has an annulus shape and is mounted with the longitudinal axis of the opening of the annulus perpendicular to the roof 20 of the building. The air exhaust fan 14 is supported by shaft 22 and bearings 24. The exhaust fan 14 including shaft 22 and bearings 24 are supported upon fan base plate 32 pivotably mounted to one edge 34 of the base plate so that upon disconnection of fanbelt 18 the fan base plate 32, air exhaust fan 14, shaft 22 and bearings 24 may be rotated 90° about said edge thereby permitting access to the inside of the air box 12 and to the air exhaust fan 14.

A discharge elbow 26 is mounted at an opening at one end of the air box 12. The discharge elbow 26 has one opened surface 28 directed generally upwardly to permit the exiting of the exhausted air 30. The air box 12 also has an opening 36 in the bottom surface thereof from which depends the gradually narrowing grease duct 38 surrounding the opening 36. While in the preferred embodiment of the present invention the opening 36 is generally square in shape and the upper portion of grease duct forms a truncated regular pyramid, it is contemplated that other shaped openings and configurations, such as rectangular and circular grease ducts could be used.

The grease duct 38 gradually narrows thereby decreasing the cross-sectional area of the grease duct until a point in the vicinity of the roof is reached. From the roof 20 to the ceiling 40 in the grease duct 38 maintains approximately the same dimensions although it is recognized that a slight inwardly directed slope may be imparted to the grease duct 38 from the roof to the ceiling 40. The grease duct 38 has connected to its lower end opposite the plurality of grease filters 68 an exhaust hood 66, extending substantially the length of cooking surface.

The washing system 42 comprising a hollow tubular member 44 rotatably mounted upon bearing 46 mounted to the walls of the grease duct is positioned substantially along the longitudinal axis of the grease duct 38. The hollow tubular member 44 is closed at both ends 48 and 50. A plurality of apertures 52 terminating in spraying heads 54 directed perpendicular to the tubular member 44 are located along the tubular member 44. One of the apertures 52 and sprayheads 54 extending from the tubular member 44 is located proximate the end 50 of the tubular member 44 within the opening of the air exhaust fan 14.

Located intermediate the ends 48 and 50 of the hollow tubular member 44 is a fluid turbine member 56, such as disclosed in the patent to Lawson, U.S. Pat. No. 3,795,181 for forcing fluid through the spraying heads 54 while rotating the hollow member 44. The substantially conical top wall 57 of the fluid turbine member 56 is directed downwardly. The fluid turbine member 56 is connected to a source of water and cleaning fluid from entrance pipe 58.

Extending from a joint 62 in entrance pipe 58 is a second pipe 64 which extends along a surface of the grease duct 38 to a point below the ceiling 40 terminating in a sprayhead 54. The sprayhead 54 is positioned so as to spray the interior surfaces of the lower portion of duct 38 and the internal side of the grease filter 68.

A grease receptor 70 is located at the lower portion of the grease duct 38 below the grease filter. A drain 72 from the grease receptor 70 leads to an appropriate grease collection facility.

The discharge elbow 26 has along its bottom surface a grease trough 74 comprising a recessed portion with an opening therein connected to one open end of a pipe 76 which has its other open end 78 terminating within the upper segment of grease duct 38.

Located substantially parallel to the grease duct 38 is a rectangular makeup air duct 80 located between the roof 20 and the ceiling 40. The makeup duct 80 extends above the roof 20 and has an opening 94 into a makeup air supply compartment 96. A makeup air supply fan 98 is located within the makeup supply fan compartment 96 for forcing supply air 100 from the outside environment through the makeup air duct 80 into the makeup hood 86. Weather louvers 102 and filters 104 located across one surface of the makeup air supply fan compartment 96 permit filtered air to flow to the makeup air supply fan 98.

Hood makeup air plenums 82 and 84 are located below the makeup air duct 80 and above the air makeup hood 86 and provide a uniform flow of makeup air within the makeup hood 86. The makeup hood 86 extending substantially the length of the cooking surface has a lower inwardly directed lip 88 substantially at the level of the bottom of the exhaust hood 66. The makeup hood 86 and the exhaust hood 66 are separated by a downwardly projecting dividing member 90 which is substantially vertical on the side of the member facing the makeup hood 86 and is upwardly and inwardly slanted on the side of the divider member 90 creating a baffle plate 67 in the exhaust hood 66. Vapor proof lights 92 may be provided in the makeup hood 86 and/or the exhaust hood 66.

Also located within a compartment of the air box 12 is the washing system network 110 control panel 60 for controlling the operation of the makeup air supply fan 98 and the washing system 42. The control panel 60 may contain a clock 106 for controlling the starting, stopping and duration of the washing cycle of the washing system 42. Contained in the washing system network 110 is a water or fluid pump 108 for pumping fluid through the washing assembly network containing detergent fill, water heating control and other related apparatus, terminating at entrance pipe 58.

The control panel 60 also contains a thermostat 112 responsive to the temperature at the exhaust hood 66. The sensors for the thermostat are positioned at the exhaust hood 66 may be controlled by any temperature sensing device. The thermostat 112 may be set at any desired temperature level. In the preferred embodiment, however, it is intended that the temperature be set at approximately 200° F. Upon the thermostat reaching the desired level the thermostat serves to electrically activate pump 108 thereby instituting the washing cycle of washing system 42 so long as the temperature at the exhaust duct 66 remains above the predetermined temperature.

Electrically connected to the control panel 60 is a remote panel 114 for indicating the operating mode of the washing system 42. The remote panel 114 may also have switching means 116 such as a toggle on/off switch for turning the washing system 42 on and off manually. A start switch 118 for starting the normal wash cycle is also provided. Indicator lights 120, 122 and 124 for indicating the operating function of the wash circuit, the heater circuit and the detergent level, respectively, or any other desired function of the system may also be provided.

Figure 2:
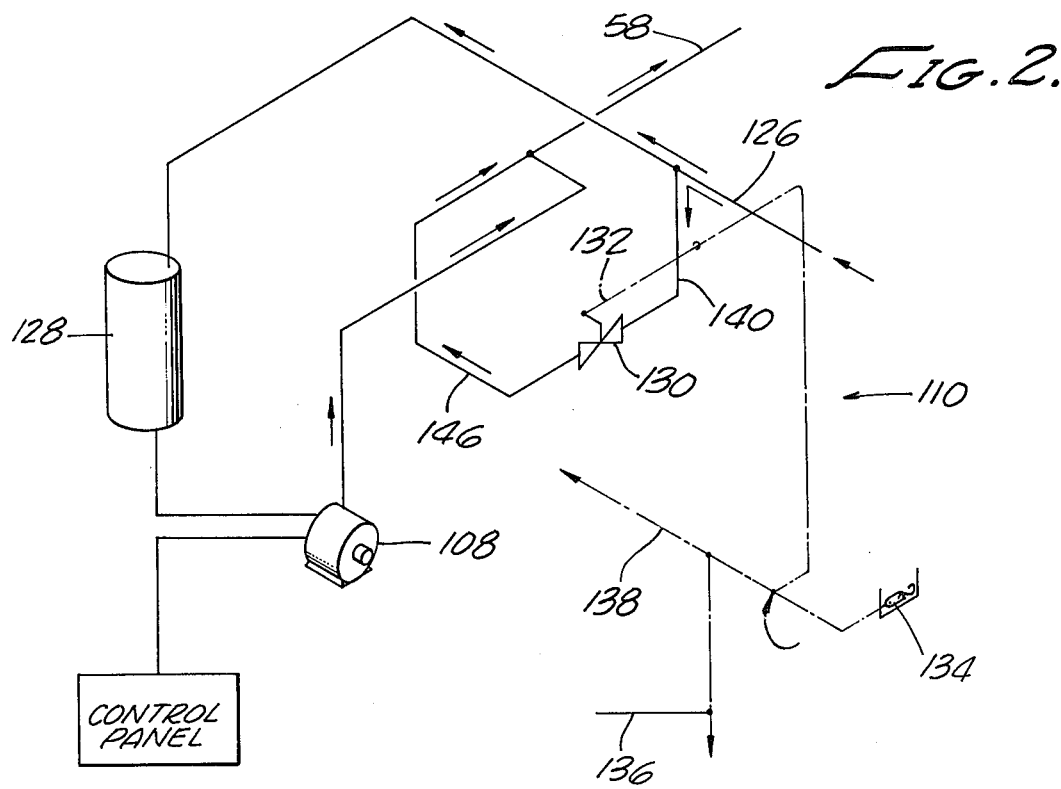
FIG. 2 is a diagramatic view of the mechanical fire extinguishing system.

Referring to FIG. 2, a diagrammatic view of the piping for the washing system network 110 is shown. Cold water from the city water supply is introduced through the cold water inlet 126 into the water heater 128. From the water heater 128 the water is then pumped by pump 108 through entrance pipe 58 to the fluid turbine member 56 where it is sprayed through sprayheads 54 on the grease duct 38.

A normally closed spring loaded mechanical valve 130 is inserted between the cold water inlet pipe 126 and entry pipe 58 bypassing the water heater 128 and pump 108. The valve 130 is maintained in normally closed position by a connecting means such as wire 132 under tension connected to a fusable link 134 mounted at the exhaust hood entry 66. The wire 132 is also maintained under tension by the connections to the cooking equipment 136 and a manual control 138.

Upon relief of the tension on wire 132 the cold water entering inlet pipe 126 passes directly through valve 130 and into entrance pipe 58 thereby spraying the grease duct 38. The water will continue to be sprayed on the grease duct 38 until the mechanical valve 130 if again physically closed, thereby preventing the bypass of the waterheater 128 and the water pump 108.

Figure 3:
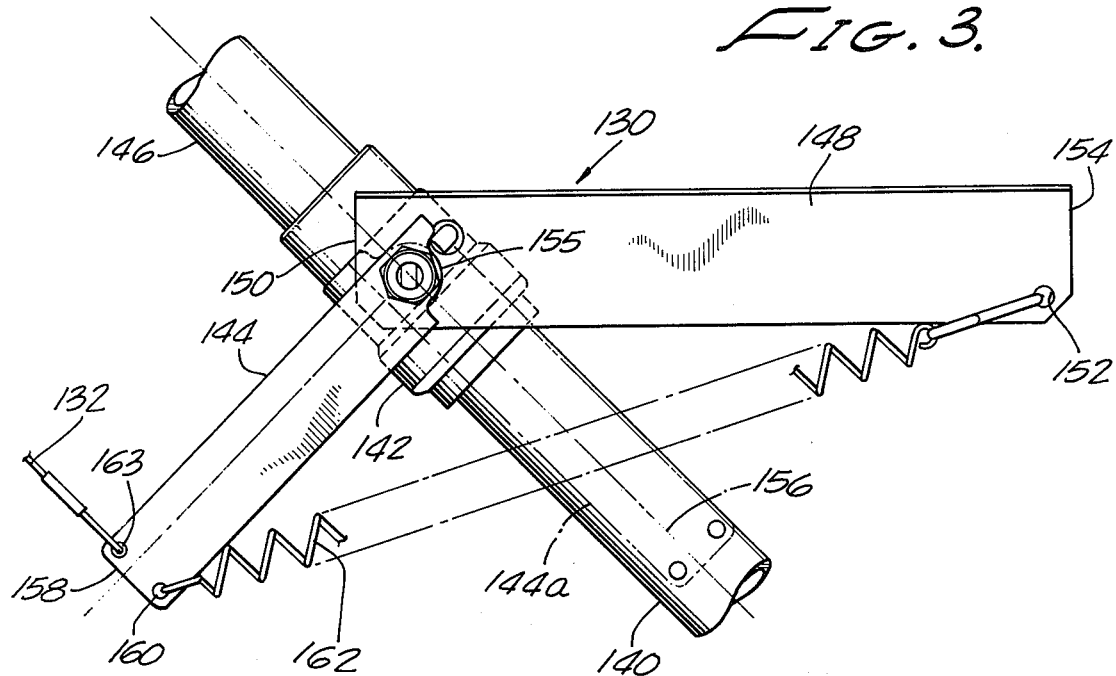
FIG. 3 is a top perspective view of the mechanical fire system valve assembly.

Referring to FIG. 3, a top view of the mechanical valve system 130 is shown in greater detail. In FIG. 3, cold water bypass inlet line 140 enters valve juncture 142. Valve juncture 142 has a conventional valve, not shown, contained therein. The position of the valve is controlled by elongated valve control arm 144. When the valve control arm 144 is in a position substantially perpendicular to the axis of the valve juncture the valve is in a closed position so that water may not pass through the valve juncture 142. When the valve arm 144 is in a position in substantial alignment with the axis of the valve juncture the valve is in an open position and water may pass through cold water bypass inlet line 140, the valve juncture 142 and bypass water line 146 to entrance pipe 58.

An elongated valve spring loading arm 148 is permanently fixed at one end 150 to valve juncture 142 and has an opening 152 at its other end 154. The valve spring loading arm 148 is positioned so that its other end 154 is on the opposite side of the axis 156 of the valve juncture 142 from the axis of elongated valve arm 144.

One end 155 of elongated valve control arm 144 is pivotably mounted to the valve juncture so as to open and close the valve when rotated. The other end 158 of the elongated valve control arm 144 has a first opening 160 and a second opening 162 in it. A spring 162 is connected between the first opening 160 and the opening 152 in the valve spring loading arm 148 thereby tending to move the valve control arm 144 from its position shown in solid lines in which the valve within valve juncture 142 is normally closed to a position such as shown by dotted lines 144a so that the valve within valve juncture 142 is in an open position thereby permitting passage of water through the valve juncture.

Connected to the opening 163 in the end 158 of the valve control arm is wire 132 which is connected to the fusable link 134 mounted at the entrance of exhaust hood 66 such as shown in FIG. 2. The tension in wire 132 is sufficient to overcome the force of spring 162 attempting to move valve control arm 144 into a position such as shown by dotted line 144a in order to open the normally closed valve in the valve juncture 142. As long as tension is maintained in wire 132 sufficient to overcome the force of spring 162 no water will be permitted to bypass the water heater and pump in order to enter entrance pipe 58 to the washing system 42. However, upon release of tension upon 132, either by the breaking of fusable link 134 due to temperatures in excess of approximately 360° F or the manual release of the tension on wire 132, spring 162 will pull the valve control arm to its position indicated by dotted lines 144a thereby opening the valve in valve juncture 142 permitting cold water to enter cold water bypass inlet line 140 directly to entrance pipe 58 for spraying water in the grease duct 38.

Cold water without detergent will continue to be sprayed within the grease duct 38 until the mechanical valve 130 is manually returned to its normally closed position or the water from the city supply to cold water inlet 126 is shut off. Thus, the mechanical fire extinguishing valve 130 is independent of the electrical system and will continue to operate regardless of termination of electrical power which might result from a fire.

While one embodiment of the mechanical fire extinguisher has been described in detail, it is recognized that other bypass control systems may be devised in which a valve contained in a bypass network is in a normally closed position, at one temperature and by either electrical or mechanical means is opened at another temperature or condition. For example, the bypass valve 130 may be opened by a spring loaded gate valve or even an electric motor responsive to the opening or breaking of a contact. Such devices do not depart from the scope of the present invention.

In operation of the air ventilation system the makeup air supply fan 98 pumps supply air through the makeup duct 80 and through hood makeup air plenums 82 and 84. A vertically slow moving, uniformly distributed layer of air is then introduced into the makeup hood 86. At the same time, exhaust fan 14 is rotating so as to create an upward draft of air through the filter 68 and up through the grease duct 38 exhausting through the upwardly open surface 28 of the discharge elbow 26.

Figure 4:
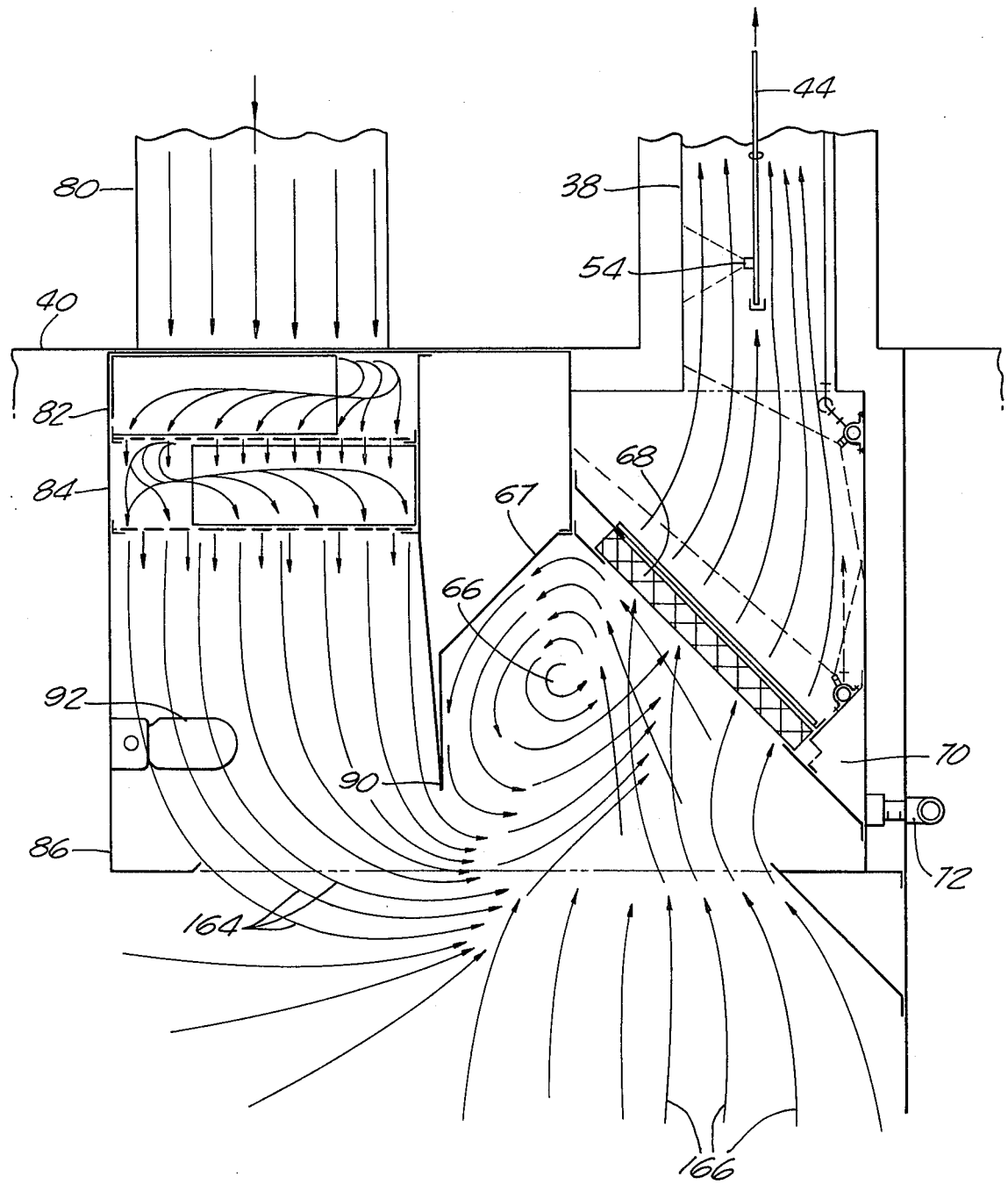
FIG. 4 is a diagramatic view illustrating the air currents in the improved ventilation system.

Referring to FIG. 4, a diagramatic view of the air currents within the air ventilation system, may be seen. As shown in FIG. 4, the make up hood 86 is shown having substantially the same width as that of the exhaust hood 66. In order to effectively withdraw contaminated air from within the enclosure, the make up hood should have a width at least one-half the width of the exhaust hood. The uniform layer of makeup air 164 resulting from the air 100 passing through the air plenums 82 and 84 enters the makeup hood 86 in a generally vertical orientation until it descends below the divider member 90. The makeup air 164 is moving very slowly during such descent. At such time the uniform layer of makeup air 164 is drawn by exhaust fan from within the makeup hood 86 into the exhaust hood 66 where it mixes with contaminated air 166. The dividing member 90 separating the exhaust hood 66 from the makeup hood 86 prevents the makeup air from entering the exhaust hood 66 until a substantial portion of the makeup air 164 has exited from the makeup hood 86 and has entered the room thereby increasing the volume of air in the room that mixes with the makeup air and in particular with the contaminated air. The exhaust hood 66 has a baffle 67 segment which causes the upwardly rising contaminated air 166 which strikes the baffle segment 67 to be deflected downwardly resulting in the further mixing of the makeup air 164 with the contaminated air 166 before being drawn through filter 68. Such mixing serves to provide a greater opportunity for the condensation of the grease within the contaminated air 166 so as to increase the amount of grease trapped by filter 68 rather than be deposited on the walls of the grease duct 38. The combination of the slowly moving vertical column of makeup air 164 and the width of the makeup hood 86 permits a very large percentage of the air exhausted to be makeup air. The percentage of makeup air to the exhausted air may be as high as 90%. This system permits only 10% of the conditioned air within the enclosure to be exhausted, thereby resulting in great savings in the energy required to properly condition the air within the enclosure.

While the preferred embodiment of the present invention has been described in detail, it is recognized that other variations may be devised which are intended to be within the concept of the invention as described.

What we claim is:

1. In a ventilation system including an interior wall defining a chamber through which contaminated hot air is adapted to pass, an improved cleaning and fire extinguishing system for cleaning contaminants from said interior wall and extinguishing any fire or incipient fire in the proximity of said chamber, comprising:

a fluid dispersing member in said chamber; said fluid dispersing member having outlet openings through which cleaning fluid may be dispersed onto said interior wall of said chamber to wash away contaminants thereon;

pump means for delivering cleaning fluid through said fluid dispersing member and onto said interior wall of said chamber;

means for selectively operating said pump means to selectively deliver cleaning fluid to said fluid dispersing member and through said outlet openings thereof and onto said interior wall of said chamber;

temperature sensing means in close proximity to said chamber for sensing the temperature within said chamber; and means operatively associated with said temperature sensing means for operating said pump means when said temperature sensing means senses a temperature above a first predetermined level in the vicinity of said chamber to deliver fluid to said fluid dispersing means and into said chamber, and further including a bypass line passing around said pump means for delivering fluid from a source of fluid to said fluid dispersing member and into said chamber; and further including a normally closed valve means in said bypass line; and further including means connected to said valve means for opening said valve means when the temperature in the vicinity of said chamber exceeds a second predetermined level above said first predetermined level for opening said valve means to deliver fluid from a source of fluid to said fluid dispersing member and into said chamber.

2. The combination according to claim 1, wherein said means for selectively operating said pump means includes a time clock means for operating said pump to deliver cleaning fluid through said fluid dispersing means and onto said interior wall of said chamber at pre-selected time intervals.

3. The combination according to claim 1, wherein said means connected to said valve means includes a heat fusible link adapted to be disrupted when the temperature in the vicinity of said chamber exceeds said second predetermined level.

4. In a ventilation system including an exhaust fan chamber, an exhaust hood and a duct extending between said exhaust fan chamber and said exhaust hood, an improved cleaning and fire extinguishing system, comprising:

a fluid dispersing member extending through said duct and into said exhaust fan chamber and said exhaust hood; said fluid dispersing member having outlet openings through which cleaning fluid may be dispersed into said exhaust fan chamber, said duct and said exhaust hood;

pump means for delivering cleaning fluid to said fluid dispersing member;

means for selectively operating said pump means to selectively deliver cleaning fluid to said fluid dispersing member and through said fluid dispersing member and into said exhaust fan chamber, said duct and said exhaust hood;

first temperature responsive means disposed in close proximity to said exhaust hood and operatively associated with said pump means for operating said pump to deliver fluid to said fluid dispersing member and through said fluid dispersing member and into said exhaust fan chamber, said duct and said exhaust hood when the temperature in the proximity of said exhaust hood exceeds a first predetermined level;

a bypass line bypassing said pump means for selectively delivering fluid from a source of fluid to said fluid dispersing member when the temperature in the vicinity of said exhaust hood exceeds a second predetermined level;

valve means disposed in said bypass line; and second temperature responsive means disposed in close proximity to said exhaust hood and operatively associated with said valve means in said bypass line for causing fluid to be delivered from a source of fluid through said bypass line and to said fluid dispersing member when the temperature in the proximity of said exhaust hood exceeds a second predetermined level above said first predetermined level.

5. The combination according to claim 4, wherein said first temperature responsive means includes a thermostat for sensing a rise in temperature above said first predetermined level in the vicinity of said exhaust hood, and further including electric circuit means operative in response to said thermostat sensing a rise in temperature above said first predetermined level in the vicinity of said exhaust hood for causing said pump means to operate to deliver fluid to said fluid dispersing member and through said fluid dispersing member and into said exhaust fan chamber, said duct and said exhaust hood.

6. The combination according to claim 4, wherein said second temperature responsive means comprises a mechanical link which is adapted to be disrupted in response to a rise in temperature above said second predetermined level in the vicinity of said exhaust hood, and further including means connecting said mechanical link to said valve means in said bypass line for opening said valve means when said mechanical link is disrupted to deliver fluid from a source of fluid to said fluid dispersing member and through said fluid dispersing member and into said exhaust fan chamber, said duct and said exhaust hood.

7. An improved exhaust, cleaning and fire extinguishing system, comprising:

means defining an exhaust chamber having an interior wall;

fluid dispersing means disposed in said exhaust chamber for selectively dispersing fluid into said exhaust chamber;

fluid delivery means for selectively delivering fluid to said fluid dispersing means;

first temperature responsive means disposed in close proximity to said exhaust chamber and operatively associated with said fluid delivering means for causing fluid to be delivered to said fluid dispersing means and onto the interior wall of said exhaust chamber when the temperature within said exhaust chamber exceeds a first predetermined level; and second temperature responsive means disposed in close proximity to said exhaust chamber and operatively associated with said fluid delivery means for causing fluid to be delivered to said fluid dispersing means and into said exhaust chamber when the temperature in said exhaust chamber exceeds a second predetermined level above said first predetermined level.

8. The combination according to claim 7, wherein said first temperature responsive means includes a thermostat for sensing a rise in temperature above said first predetermined level in the vicinity of said exhaust chamber, and further including electric circuit means operative in response to said thermostat sensing a rise in temperature above said first predetermined level in the vicinity of said exhaust chamber for causing said pump means to operate to deliver fluid to said fluid dispersing means and through said fluid dispersing means and into said exhaust chamber.

9. The combination according to claim 8, wherein said second temperature responsive means comprises a mechanical link which is adapted to be disrupted in response to a rise in temperature above said second predetermined level in the vicinity of said exhaust chamber, and further including means operative in response to disruption of said mechanical link to deliver fluid from a source of fluid to said fluid dispersing means and through said fluid dispersing means and into said exhaust fan chamber, said duct and said exhaust hood.

10. An improved exhaust, cleaning and fire extinguishing system according to claim 7, wherein said fluid delivery means includes a fluid pump for pumping fluid into said fluid dispersing means; and wherein said pump is operatively associated with said first temperature responsive means and is actuated thereby to deliver fluid to said fluid dispersing means and cause said fluid to be dispersed against the interior wall of said exhaust chamber when the temperature within said exhaust chamber exceeds said first predetermined level.

11. An improved exhaust, cleaning and fire extinguishing system according to claim 10, and further including a fluid by-pass line by-passing said pump; and wherein said fluid delivery means further includes a normally closed by-pass valve in said by-pass line; said valve being adapted, when opened, to pass fluid through said fluid dispersing means and into said exhaust chamber; said valve being operatively associated with said second temperature responsive means and being opened thereby when the temperature in said exhaust chamber exceds said second predetermined level above said first predetermined level.

12. An improved exhaust, cleaning and fire extinguishing system according to claim 7, wherein said exhaust chamber has an inlet end and an outlet end; and further comprising an air delivery chamber; said air delivery chamber including an inlet end and an outlet end; said outlet end of said air delivery chamber being disposed adjacent to said inlet end of said exhaust chamber; and means for delivering air through said air delivery chamber.

13. An improved exhaust, cleaning and fire extinguishing system according to claim 7, wherein said second temperature responsive means comprises a temperature sensitive element which is adapted to be disrupted when the temperature in said exhaust chamber exceeds said second predetermined level.

14. An improved exhaust, cleaning and fire extinguishing system according to claim 13, wherein said second temperature responsive means comprises a fusable link.

15. An improved exhaust, cleaning and fire extinguishing system according to claim 7, wherein said fluid dispersing means includes a rotatable spray tube extending through at least a substantial portion of said exhaust chamber; and further comprising drive means for rotating said tube.

* * * * *